(12) United States Patent
Pelley (10) Patent No.: US 7,539,209 B2
(45) Date of Patent: May 26, 2009

(54) METHOD AND DEVICE FOR PRESERVING PACING INFORMATION ACROSS A TRANSPORT MEDIUM

(75) Inventor: Barry Leo Pelley, Kinburn (CA)

(73) Assignee: Ciena Corporation, Linthicum, MD (US)

( * ) Notice: Subject to any disclaimer, the term of this patent is extended or adjusted under 35 U.S.C. 154(b) by 1238 days.

(21) Appl. No.: 10/382,041

(22) Filed: Mar. 5, 2003

(65) Prior Publication Data

US 2004/0177153 A1    Sep. 9, 2004

(51) Int. Cl.
*H04J 3/16* (2006.01)
*H04B 3/10* (2006.01)
*H04J 3/22* (2006.01)

(52) U.S. Cl. .................. 370/468; 370/491; 370/465

(58) Field of Classification Search .................. None
See application file for complete search history.

(56) References Cited

U.S. PATENT DOCUMENTS

| | | | | |
|---|---|---|---|---|
| 5,642,360 | A * | 6/1997 | Trainin | 370/230 |
| 5,870,398 | A * | 2/1999 | Kotchey | 370/445 |
| 6,115,357 | A * | 9/2000 | Packer et al. | 370/231 |
| 6,118,793 | A * | 9/2000 | Chen | 370/470 |
| 6,167,048 | A * | 12/2000 | Law et al. | 370/395.62 |
| 6,226,290 | B1 * | 5/2001 | Salett et al. | 370/389 |
| 6,347,084 | B1 * | 2/2002 | Hulyalkar et al. | 370/347 |
| 6,389,018 | B1 * | 5/2002 | Clauberg | 370/394 |
| 6,470,031 | B1 * | 10/2002 | Loy et al. | 370/503 |
| 6,728,803 | B1 * | 4/2004 | Nelson et al. | 710/60 |
| 6,778,537 | B1 * | 8/2004 | Ishibashi | 370/395.62 |
| 6,791,987 | B1 * | 9/2004 | Eng et al. | 370/395.62 |
| 6,801,505 | B1 * | 10/2004 | Cognet | 370/252 |
| 6,816,510 | B1 * | 11/2004 | Banerjee | 370/503 |
| 6,868,093 | B1 * | 3/2005 | Bohm et al. | 370/506 |
| 6,944,188 | B2 * | 9/2005 | Sinha et al. | 370/503 |

(Continued)

FOREIGN PATENT DOCUMENTS

JP    2002-0374791    * 12/2002

OTHER PUBLICATIONS

"Transparent Generic Framing Procedure (GFP): A protocol for Efficient Transport of Block-Coded Data through SONE/SDH Networks", by Steven Gorshe & Trevor Wilson. IEEE Communications Magazine, May 2002, pp. 88-95.*

*Primary Examiner*—Chi H Pham
*Assistant Examiner*—Warner Wong
(74) *Attorney, Agent, or Firm*—Clements Bernard PLLC; Christopher L. Bernard; Tyler S. Brown (57) ABSTRACT

The invention relates to data communications, more particularly to a protocol encapsulation technique which captures the time between frames at a transmitting site for comparison with an idle counter at a receiving site. At the originating site, the time between successive frames in the native protocol is encoded in an interframe time field associated with each respective frame, before the time encoded frame is mapped into the protocol associated with the transport medium. At the destination site, the framing associated with the transport medium is removed to reveal the interframe time field. The value contained in this field is compared with the value of an idle counter running at the native protocol rate. When the idle count is greater than or equal to the encoded inter-frame time, the data contained in the frame is then delivered to the client.

16 Claims, 6 Drawing Sheets

Frame Encapsulation

Transmit Order

U.S. PATENT DOCUMENTS

2002/0105905 A1* 8/2002 Boyle et al. .................. 370/229
2003/0161307 A1* 8/2003 Lo ............................. 370/389
2003/0174734 A1* 9/2003 Compton et al. ............ 370/503
2003/0235214 A1* 12/2003 Leroux et al. ................ 370/504
2004/0062278 A1* 4/2004 Hadzic et al. ............... 370/503
2005/0058065 A1* 3/2005 Tiller et al. .................. 370/229

* cited by examiner

METHOD AND DEVICE FOR PRESERVING PACING INFORMATION ACROSS A TRANSPORT MEDIUM

FIELD OF THE INVENTION

The invention relates to data communications, more particularly to a method of signalling across a transport medium the idle time between data frames integral to a native protocol associated with a pair of communicating devices.

BACKGROUND TO THE INVENTION

Modern enterprises are often geographically dispersed, with servers, data storage facilities and other communications devices interconnected through a metropolitan or wide area network (MAN/WAN). Enterprises typically rely on three main types of MAN/WAN infrastructures:
  a) IP/Ethernet networks;
  b) Dense wavelength division multiplexing (DWDM) networks; and
  c) Synchronous optical networks (SONET).

Figure 1:
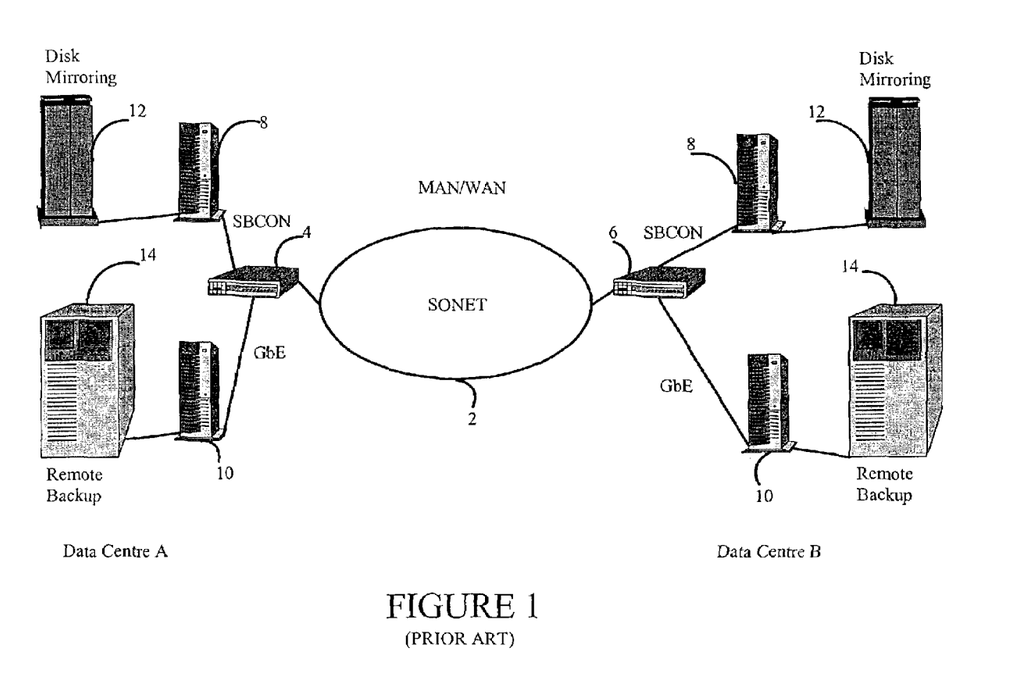
FIG. 1 depicts a network diagram of the prior art in which the present invention could be implemented.

Enterprises often require data transmission solutions that are able to support a variety of protocols, individually and concurrently. For example, a typical enterprise may need to transport Single Byte Command Code Sets Connection (SB-CON) and Gigabit Ethernet (GbE) formatted data in support of particular applications. As depicted in FIG. 1, SONET/SDH network 2 connects multiplexers 4, 6 to SBCON and GbE to switches 8, 10 which in turn connect to client devices 12, 14, performing storage functions. The multiplexers/demultiplexers 4, 6 such as Akara Corporation's Optical Utility Services Platform (OUSP)™ multiplex/demultiplex client data protocols such as Fibre Channel (FC), Fibre Connection (FICON), Gigabit Ethernet (GbE), Enterprise System Connection (ESCON) and Single Byte Command Code Sets Connection (SBCON) directly into, for example, a SONET/SDH OC-3, OC-12, or OC-48 payload and transports it natively using SONET/SDH network 2 between geographically dispersed data centres A and B.

It will be understood by those in the art that frame based protocols such as Ethernet and SBCON, use idles between consecutive frames to both fill quiet time and guarantee a minimum time between frames. Such minimum inter-frame times may be required, for example, to ensure that the receiving device can process the current frame before subsequent frames are transmitted, in order to avoid receive buffer overflow resulting in data loss.

It will also be understood by those skilled in the art that some frame based protocols such as the American National Standards Institute (ANSI) standard interface protocol SBCON, use minimum spacing between frames which is negotiated between communicating pairs of end systems. This is referred to as time-based pacing. The pacing parameters are negotiated during initialization between the communicating devices. Devices used to transport multiple pairs of communicating devices across a single transport medium, such as a MAN/WAN link, may have to preserve different sets of pacing parameters for each communicating pair of end systems. As will be also appreciated by those in the art, time based pacing is one flow control technique associated with the data link layer defined in the Open Systems Interconnection (OSI) Reference Model developed by the International Organization for Standardization (ISO). A sublayer of the data link layer, the logical link control sublayer, is responsible for, among other things, controlling frame synchronization, error checking and flow control. Time based pacing is one of two primary flow control techniques, the other being credit-based flow control, whereby a data link regulates the flow of traffic by sending credit tokens to sources.

Either participating in, or snooping, the initialization procedure to determine potentially many different pacing parameters can be quite complicated and introduce undesirable system costs as well as additional transport latency. In addition, maintaining pacing information across transport media which transport information at rates different than the native protocol rate increases the complexity of the implementation.

At the present time, known solutions to this problem either terminate the protocol prior to the transport medium or provide a transport medium that is synchronous and transparent to the protocol. Devices which terminate the protocol are very complex and therefore expensive, since they must be application aware. Such implementations can require device spoofing and protocol translation. Further, processing capacity and cost places limits on the number of communicating devices that can be supported. Latency also increases due to the protocol interactions at both the entry and exit points of the transport systems.

Devices which provide synchronous protocol transparency such as DWDM, eliminate the complexities of protocol termination but they prevent transmission at transport rates other than those of the native protocol. This significantly reduces the connectivity options available.

There is a need, therefore, for a simple, low cost and reliable method for preserving data link layer (i.e. flow control) pacing information between clients communicating natively at rates other than the transfer rate of the transport medium.

SUMMARY OF THE INVENTION

The invention provides a device for and method of preserving pacing information through a simple protocol encapsulation technique which captures the time between frames for comparison with an inter-frame time counter (e.g. implemented using an idle counter) at the receiving destination. At the originating site, as part of the encapsulation process, the time between successive frames in the native protocol is encoded in an inter-frame time field associated with each respective frame, before the encapsulated frame is mapped into the protocol associated with the transport medium. At the destination site, the framing associated with the transport medium is removed to reveal the inter-frame time field. The value contained in this field is compared with an inter-frame time represented by the value of an idle counter running at the native protocol rate. When the inter-frame time represented by the idle count is greater than or equal to the inter-frame time encoded the inter-frame time field, the data contained in the frame is then delivered to the client.

In accordance with one aspect of the invention there is provided a method of preserving data link layer pacing information across a transport medium comprising: receiving serial data at a deserializer from a client in a first protocol format at a first rate; recovering a clock signal from said received serial data; converting the received serial data to parallel data and inputting the parallel data to a FIFO queue; detecting the end of a preceding client frame at a receive controller and clearing an inter-frame time counter having an associated count; incrementing the inter-frame time counter until the start of a current client frame is received; detecting the start of the current client frame; inserting in the current client frame a start of frame delimiter followed by the associated count of the incremented inter-frame time counter; optionally sending the current client frame to a receive buffer; inserting an end of frame delimiter when the end of the current frame is detected; extracting the current client frame from the receive buffer to a mapper; and mapping the current client frame into a protocol format associated with the transport medium, and serializing the mapped frame for transmission across the transport medium at a second data rate.

In accordance with another aspect of the invention there is provided a method of preserving data link layer pacing information across a transport medium carrying client data, wherein, prior to transmission over the transport medium, each frame of the client data is encoded with an inter-frame time field indicating the time between the start of a current frame and the end of a preceding frame, the method comprising: receiving serial data into a deframer at a destination site connected to the transport medium; converting the serial data to parallel data; removing any framing associated with the transport medium; decoding the parallel data at a de-mapper and placing the parallel data in a transmit buffer; incrementing a transmitter idle counter; detecting a frame in a transmit buffer with a transmit controller; extracting a start of frame delimiter field and the inter-frame time field from the detected frame; comparing an inter-frame time represented by the incrementing transmitter idle counter to the inter-frame time field; if the time count captured in the transmitter idle counter is greater than or equal to the encoded time contained in the inter-frame time field, feeding the frame to a serializer and removing an end of frame delimiter; and serializing the frame and sending said frame to a client, wherein the client data is associated with a first protocol format and is transmitted at a first data rate; and wherein the transport medium is associated with a second protocol format and operates at a second data rate.

The advantages of the present invention are numerous. The invention provides a simple, reliable and low cost method for preserving pacing information among any number of device pairs communicating across a transport medium at any rate. Since the pacing information is signalled in time units rather than transmission units, the method works equally well with transport rates which are either greater or lesser than the native protocol. Further, when this method is used with a transport rate which is less than the protocol rate, bandwidth efficiency can be gained since many idles at the protocol rate can be communicated across the transport medium with a single inter-frame time parameter. In addition, the simplicity of this method can significantly reduce the cost and improve the reliability of networks which transport the protocols benefiting from this invention. Finally, the low latency and transparency offered by this invention at the protocol layers and above, can enable applications which were previously not suitable for economical transport over a MAN/WAN.

BRIEF DESCRIPTION OF THE DRAWINGS

A better understanding of the invention will be obtained by considering the detailed description below, with reference to the following drawings in which.

DETAILED DESCRIPTION OF THE PREFERRED EMBODIMENT

In essence, the invention describes a protocol encapsulation technique that can be used to signal across a transport medium the time between when a preceding frame was transmitted and a current frame was received. For the purposes of the description, the terms transmit and receive are used to describe data flow with respect to a client connected to a transport medium. For the purposes of illustration, an implementation using SONET as the transport medium is described, although it will be understood by those skilled in the art that the invention could also be used in any MAN/WAN network.

Figure 2A:
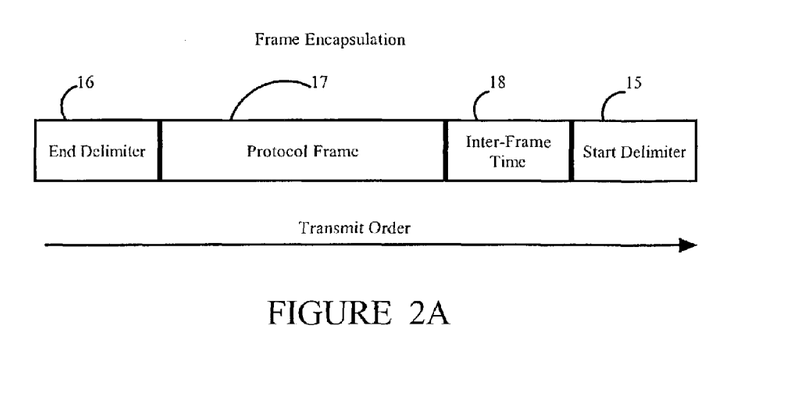
FIG. 2A depicts the method of frame encapsulation integral to the present invention.
Figure 2B:
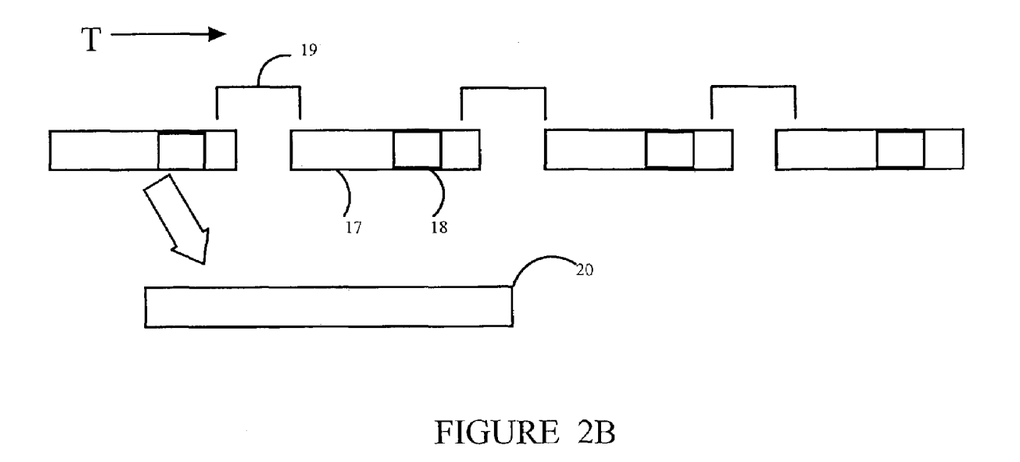
FIG. 2B depicts a typical frame sequence in which the present invention is used.

Referring to FIG. 2A, a start delimiter 15 and an end delimiter 16 are inserted when the protocol frame 17 is received from the client at an originating end. These delimiters are removed prior to transmission to the client at the destination end, as will be explained. The delimiters 15, 16, are used to signal frame boundaries during transmission over the transport medium. Integral to the invention, an inter-frame time field 18 is inserted, indicating the time between when the start of the present frame and the end of the previous frame were received (i.e. the inter-frame time). It will be understood by those skilled in the art that protocol frame 17 could include an SBCON frame, but the invention is applicable to any data link layer protocol based on pacing. Referring to FIG. 2B and as will be explained in more detail below, as protocol frames 17 arrive from the client over time T, the inter-frame time field 18 is encoded with the inter-frame time 19. The encoded frames are then mapped to a protocol frame 20 associated with a transport medium over which the client data will flow.

The invention comprises receive and transmit components, both of which are contained in devices at the origination and destination points respectively. The receive operation is performed by a device at the originating entity, while the transmit operation is performed by a device at the destination entity. In the event that data was transmitted in the opposite direction, the receive and transmit operations would be reversed. A device such as the OUSP™ multiplexer/demultiplexer offered by AKARA corporation could be used to perform the receiver/transmitter functions, but the functionality offered by the invention is not restricted to use in such a device.

Figure 3A:
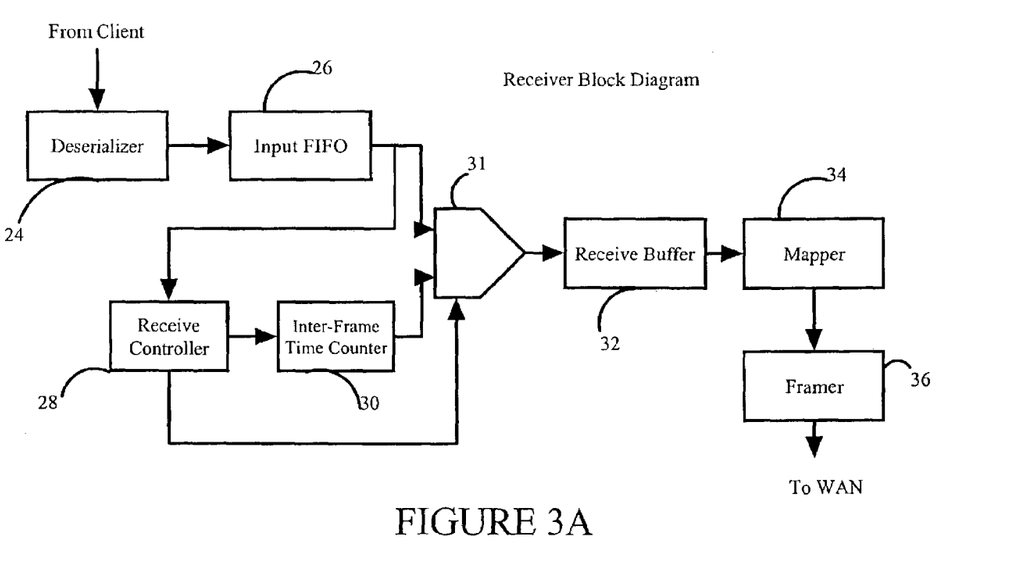
FIG. 3A depicts a block diagram of a receiver used in the present invention.
Figure 3B:
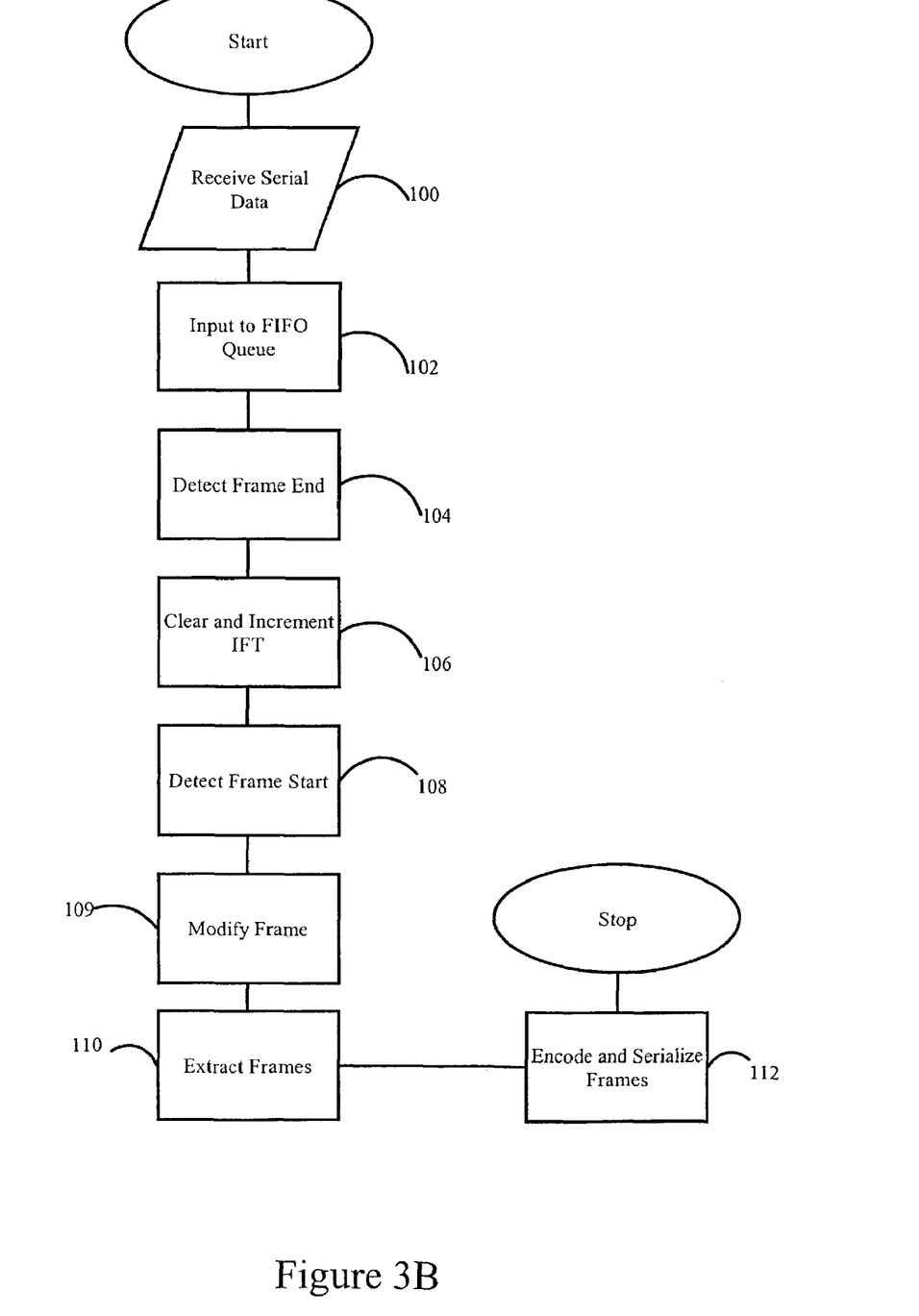
FIG. 3B depicts a flow chart detailing the steps of the receiver operation.

The receive operation will now be described in relation to FIGS. 3A and 3B. At step 100, a deserializer 24 receives serial data from a client located at an originating site. The deserializer recovers a clock signal and converts the receive data from serial to parallel. The clock signal is used simply to determine character boundaries used in the local parallel processor of the receiver (i.e. the serial data is converted to simplify local processing). At step 102, the receive data is then flowed to an input FIFO memory 26 which serves as an elastic buffer queueing the parallel receive data.

When the end of a client frame is detected at step 104 by the receiver controller 28, the inter-frame time counter (IFT) 30 is cleared and then increments until the start of the next client frame is detected or until it reaches a maximum count (step 106). The maximum count is equal to the largest minimum inter-frame gap defined for the protocol. The IFT 30 counts at a rate equal to the protocol transmit time for a single idle character.

When the start of the next client frame is detected at step 108, the receive controller 28 modifies the newly received frame with a start of frame delimiter 15 followed by an inter-frame time field 18 containing the value of the IFT 30 (step 109). This encoded frame then flows into the receive buffer 32. As evident from the drawing, the FIFO 26 and the IFT 30 are connected through multiplexer 31 to the receive buffer 32. It will be understood by those skilled in the art that receive buffer 32 is useful to perform many functions including rate adaptation and burst absorption, but need not be employed where data is to be streamed e.g. when the transport rate is greater than or equal to the protocol rate. When the end of the client frame is detected, the end of frame delimiter 16 is inserted. The mapper 34 then extracts the encoded frame at step 110 from the receive buffer 32. Where the transport medium is a SONET network, the mapper 34 then encodes the frame in order to maintain character synchronization. This is required since SONET frame boundaries are arbitrary with respect to the encapsulated frame boundaries. It should be noted that the mapper 34 extraction rate could be greater or less than the native protocol rate i.e. there is no synchronization between the client and the transport medium. The frame is then placed into SONET format at the framer 36 as described, for example, in U.S. application Ser. No. 09/728, 970 entitled Flexible Multiplexer/Demultiplexer and Method For Transport of Optical Line Data to a Wide/Metro Area Link filed by Bisson et al. on Dec. 4, 2000, the contents of which are herein incorporated by reference. The frames are then serialized at step 112 for transmission over the MAN/WAN at the transport rate of the medium.

As indicated above, when the inter-frame time is determined between a preceding and current frame, the time is encoded on the current frame. It will also be understood by those skilled in the art that alternately, the inter-frame time could be encoded on the preceding frame. This alternate technique would also accommodate the preservation of pacing information between clients communicating natively at rates other than the transfer rate of the transport medium and is meant to be included within the scope of the invention.

Upon initialization or reset, an additional procedure is required because the first frame arriving in the data stream from the client has not been encoded with an inter-frame time count. In this case, a default inter-frame time is assigned to the IFT 30. The IFT 30 then increments until the first frame is received. The value of the counter is then encoded in the frame.

Figure 4A:
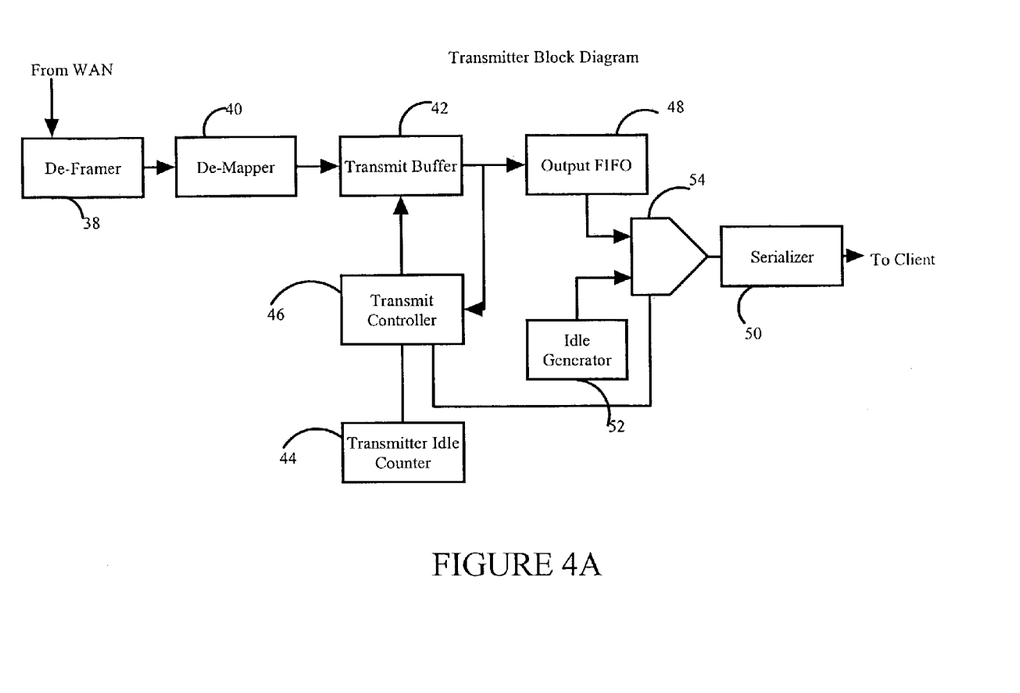
FIG. 4A depicts a block diagram of a transmitter used in the present invention.
Figure 4B:
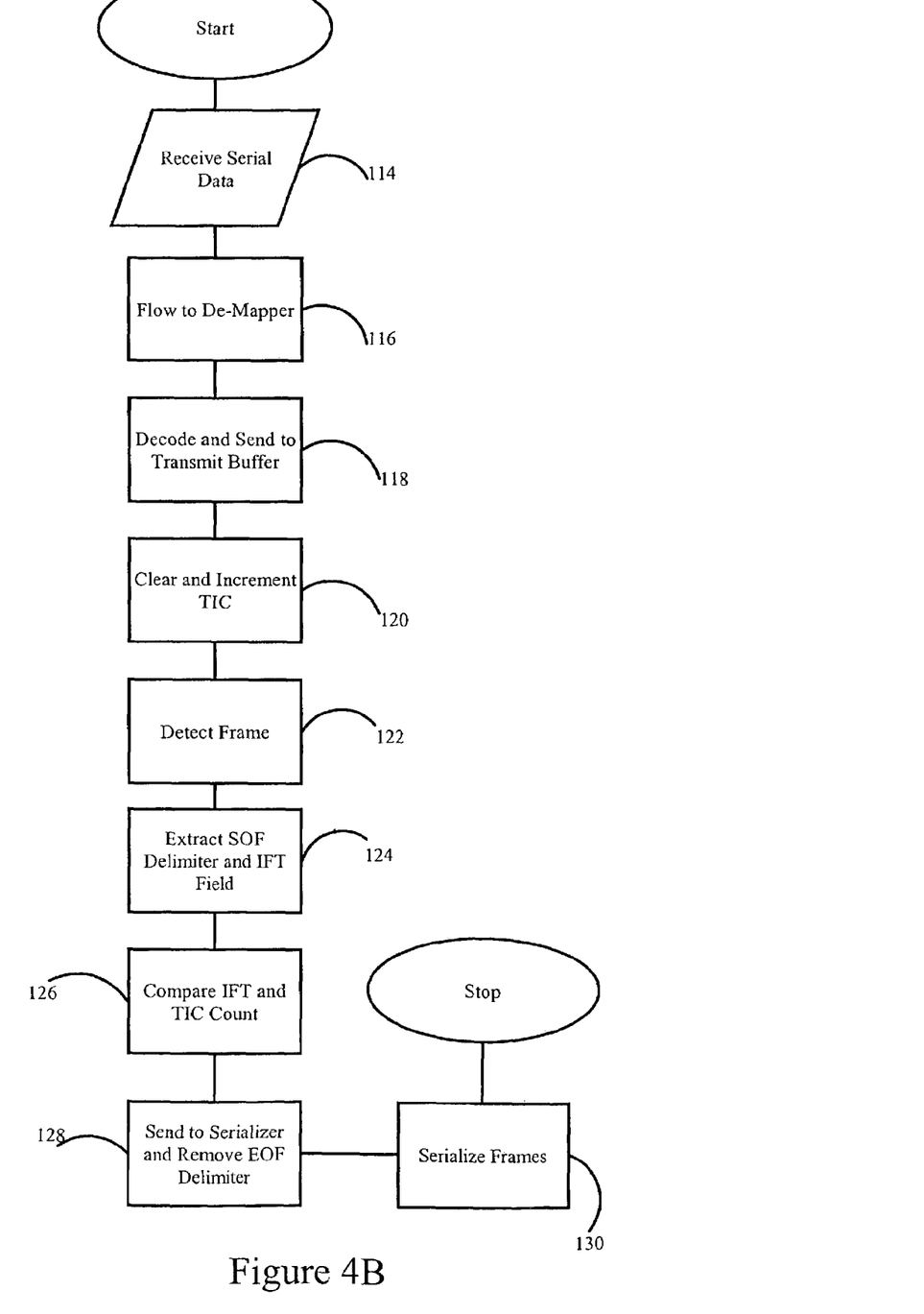
FIG. 4B depicts a flow chart detailing the steps of the transmitter operation.

The transmit operation performed at the destination end will now be described in relation to FIGS. 4A and 4B. The de-framer block 38 receives the serial data stream from the MAN/WAN at step 114, converts it to parallel data and removes the SONET framing. The encoded data is then sent to the de-mapper 40 at step 116. At step 118, the de-mapper then decodes the data and places the encapsulated frames into the transmit buffer 42. The transmitter idle counter (TIC) 44 is cleared when the end of frame delimiter is extracted from the transmit buffer 42 or after a reset. At step 120, the TIC 44 increments until it reaches a maximum count (or is cleared again). The maximum count is equal to the largest minimum inter-frame gap defined for the protocol. The TIC 44 counts at a rate equal to the protocol transmit time for a single idle character.

When the transmit controller 46 detects a frame in the transmit buffer 42 at step 122, it extracts the start of frame delimiter 15 and the inter-frame time encapsulation field 18 at step 124. These fields do not get placed into the output FIFO 48 since they do not form part of the client data. At step 126, the transmit controller 46 then compares an inter-frame time represented by the TIC 44 count to the extracted IFT 30 count (i.e. the inter-frame time 19 encoded in the inter-frame time field 18 during the receive operation). When the TIC 44 count is greater than or equal to the IFT 30 count, the frame is taken from the transmit buffer 42 and fed to the serializer 50 through the output FIFO 48. When the end of frame delimiter 16 is detected, it is removed and not placed in the output FIFO 48. At step 130, the serialized frames are sent to the client.

The output FIFO 48 and the idle generator 52 are connected through a multiplexer 54 to the serializer 50. The idle generator 52 is enabled through the multiplexer whenever there is no frame data to be sent.

It should also be understood that the receive and transmit operations described in the previous sections allow the inter-frame time gap to be preserved perfectly from client source to destination when the entire system is operating synchronously. When the reference clocks at the client receiver and transmitter are not synchronized, as would be the case in most implementations, the inter-frame time reproduced at the transmitter may have to be periodically reduced by one idle time less than received to adjust the transmit rate. This is required to avoid potential overflows at the transmit buffer which can occur when the transmit reference clock is operating at a lower rate than the receive reference clock. To overcome this problem, a solution well known in the art is implemented—the fill level of the transmit buffer is monitored to determine when inter-frame time reduction is required.

It is also important to appreciate that the insertion of an inter-frame time field 22 integral to this invention does not disrupt the application of the Generic Framing Procedure (GFP) outlined by the International Telecommunications Union (ITU) in recommendation G.7041/Y.1303, the contents of which is herein incorporated by reference. This recommendation defines a framing procedure to delineate octet-aligned variable-length payloads from higher layer client signals for mapping into octet synchronous networks (e.g. SONET). GFP consists of both common and client-specific aspects. Common aspects apply to all GFP adapted traffic. Client-specific aspects include two modes of client signal adaptation:

a) PDU-oriented, referred to as Frame-Mapped GFP, for use with PDU-oriented signals (such as IP/PPP or Ethernet); and b) Block-code oriented, referred to as Transparent GFP, for use with constant bit rate streams (such as Fibre Channel or ESCON/SBCON).

The invention described can in principle be used with both of the mapping paradigms above, while allowing for deletion (i.e. non-mapping/transport) of inter-frame idles. From a practical standpoint, the present invention serves to enhance the useful scope of GFP.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

I claim:

1. A method of preserving data link layer pacing information across a synchronous transport medium comprising:
    (a) receiving serial data at a deserializer from a client in a first protocol format at a first rate, wherein said first protocol format is SBCON;
    (b) recovering a clock signal from said received serial data;
    (c) converting said received serial data to parallel data and inputting said parallel data to a FIFO queue;
    (d) detecting the end of a preceding client frame at a receive controller and clearing an inter-frame time counter having an associated count, wherein said detecting comprises detecting an end of frame delimiter in said preceding client frame, and wherein said clearing is responsive to detecting said end of frame delimiter;
    (e) incrementing said inter-frame time counter until the start of a current client frame is received;
    (f) detecting the start of said current client frame;
    (g) inserting in the current client frame a start of frame delimiter followed by the associated count of said incremented inter-frame time counter, wherein said associated count of said incremented inter-frame time counter comprises a variable indication of time between when a start of said current client frame and an end of said preceding client frame were received;
    (h) adjusting said inter-frame counter responsive to synchronization between a reference clock at a client receiver and a reference clock at a client transmitter;
    (i) inserting said end of frame delimiter when the end of said current frame is detected, wherein said end of frame delimiter signals a frame boundary of said current frame across said synchronous transport medium, and wherein said end of frame delimiter is utilized to reset said inter-frame counter;
    (j) extracting said current client frame from said receive buffer to a mapper; and
    (k) synchronously mapping said current client frame into a synchronous protocol format associated with said synchronous transport medium, and serializing said mapped frame for transmission across said synchronous transport medium at a second data rate, wherein said synchronous transport medium is a SONET network, wherein said first client frame is encoded following extraction to maintain character synchronization, and wherein a rate of said first protocol format is one of greater and lesser than a rate of said synchronous transport medium.

2. The method of claim 1 wherein the maximum number of said time increments is equal to the largest minimum inter-frame time gap defined for said first protocol format.

3. The method of claim 1 wherein upon initialization or reset, a default inter-frame time is assigned to said inter-frame time counter, and wherein said inter-frame time counter increments until a first frame is received, and wherein the associated count of said incremented inter-frame time counter is inserted in said first frame.

4. The method of claim 1 wherein said inter-frame time counter counts at a rate equal to the protocol transmit time for a single idle character.

5. The method of claim 1 wherein the rate of extraction is greater than said first protocol rate.

6. The method of claim 1 wherein the rate of extraction is less than said first protocol rate.

7. A method of preserving data link layer pacing information between two or more clients communicating over a synchronous transport medium, said method comprising:
    signaling across the synchronous transport medium the time between when a preceding frame was transmitted and a current frame was received, wherein each of said preceding frame and said current frame comprise a staff of frame delimiter and an end of frame delimiter to signal a frame boundary of each of said preceding frame and said current frame across said synchronous transport medium; and
    modifying the signaling responsive to synchronization between a reference clock at a client receiver and a reference clock at a client transmitter;
    wherein said time between when a preceding frame was transmitted and a current frame was received is calculated through an inter-frame time counter which is reset responsive to detecting said end of frame delimiter of said preceding frame and incremented until receipt of said start of frame delimiter of said current frame, and wherein said time comprises a variable amount;
    wherein said two or more clients communicate using a first protocol at a first data rate and said synchronous transport medium communicates using a second protocol at a second data rate;
    wherein said first protocol format is SBCON and said synchronous transport medium is a SONET network; and
    wherein a rate of said first protocol format is one of greater and lesser than a rate of said synchronous transport medium.

8. A method of preserving data link layer pacing information across a synchronous transport medium carrying client data, wherein, prior to transmission over the synchronous transport medium, each frame of said client data is encoded with an inter-frame time field indicating the time between the start of a current frame and the end of a preceding frame, said method comprising:
    (a) receiving serial data into a deframer at a destination site connected to said synchronous transport medium;

(b) converting said serial data to parallel data;

(c) removing any framing associated with said synchronous transport medium;

(d) decoding said parallel data at a de-mapper and placing said parallel data in a transmit buffer;

(e) incrementing a transmitter idle counter;

(f) detecting a frame in a transmit buffer with a transmit controller;

(g) extracting a staff of frame delimiter field and said inter-frame time field from said detected frame, wherein said inter-frame time field comprises a variable indication of time between when a start of said current frame and an end of said preceding frame were received, and wherein said inter-frame time field is calculated through an inter-frame time counter which is reset responsive to detecting an end of frame delimiter of said preceding frame and incremented until receipt of a start of frame delimiter of said current frame;

(h) reducing the inter-frame time field periodically to adjust a transmit rate;

(i) comparing an inter-frame time represented by said incrementing transmitter idle counter to said inter-frame time field;

(j) if the time count captured in said transmitter idle counter is greater than or equal to the encoded time contained in said inter-frame time field, feeding said frame to a serializer and removing an end of frame delimiter, wherein said end of frame delimiter signals a frame boundary of said current frame received from said synchronous transport medium; and (k) serializing said frame and sending said frame to a client, wherein said client data is associated with a first protocol format and is transmitted at a first data rate, wherein said first protocol format comprises SBCON;

wherein said transport medium is associated with a second protocol format and operates at a second data rate, wherein said second protocol format comprises SONET; and wherein a rate of said first protocol format is one of greater and lesser than a rate of said second protocol format.

9. The method of claim 8 wherein said inter-frame counter is cleared upon reset.

10. A method as claimed in claim 8 further including the step of monitoring said transmit buffer to determine if a transmit rate associated with said destination site requires adjustment.

11. The method of claim 8 wherein said transmit idle counter counts at a rate equal to the protocol transmit time for a single idle character.

12. A computer system configured to operate a computer data signal embodied in a carrier wave, said data signal providing data link layer pacing information to a receiving entity, said computer system configured to operate said data signal comprising:

(a) means for transmitting a frame of a client protocol comprising SBCON, wherein said transmitted frame is transmitted synchronously;

(b) means for providing a value representing the time between the end of a preceding frame and the start of a current frame of said client protocol, said time comprising a variable indication of time between when a start of said current frame and an end of said preceding frame were received; and (c) means for modifying the time responsive to lack of synchronization between a reference clock at a client receiver and a reference clock at a client transmitter;

wherein each of said preceding frame and said current frame comprise a start of frame delimiter and an end of frame delimiter to signal a frame boundary of each of said preceding frame and said current frame to said receiving entity, wherein said time between the end of a preceding frame and the start of a current frame of said client protocol is calculated utilizing said end of frame delimiter of said preceding frame and said start of frame delimiter of said current frame;

wherein said data signal communicates to said receiving entity utilizing SONET; and wherein a rate of said client protocol is one of greater and lesser than a rate of a communication to said receiving entity.

13. A method of managing the communication between originating and destination entities connected to a transport medium, comprising the steps of:

(a) generating a frame containing a value representing the time between the end of a preceding frame and the staff of a current frame of a client protocol comprising SBCON, wherein each of said preceding frame and said current frame comprise a staff of frame delimiter and an end of frame delimiter to signal a frame boundary of each of said preceding frame and said current frame from the originating entity to the destination entity, wherein said value is calculated utilizing said end of frame delimiter of said preceding frame and said staff of frame delimiter of said current frame, and wherein said value comprises a variable amount;

(b) synchronously transmitting the generated frame from the originating entity;

(c) receiving the generated frame at the destination entity; and (d) handling the received frame in conjunction with the inter-frame timing information, wherein the inter-frame timing information is periodically reduced to adjust a transmit rate;

wherein a rate of said client protocol is one of greater and lesser than a rate of said generated frame.

14. A computer-readable medium having stored thereon, computer-executable instructions, which when implemented by a computer processor, cause the computer processor to perform the steps defined in claim 1.

15. A computer-readable medium having stored thereon, computer-executable instructions, which when implemented by a computer processor, cause the computer processor to perform the steps defined in claim 8.

16. A method of preserving data link layer pacing information across a synchronous transport medium comprising:

(a) receiving serial data at a deserializer from a client in a first protocol format at a first rate, wherein said first protocol format is SBCON;

(b) recovering a clock signal from said received serial data;

(c) converting said received serial data to parallel data and inputting said parallel data to a FIFO queue;

(d) detecting the end of a preceding client frame at a receive controller and clearing an inter-frame time counter having an associated count, wherein said detecting comprises detecting an end of frame delimiter in said preceding client frame, and wherein said clearing is responsive to detecting said end of frame delimiter;

(e) incrementing said inter-frame time counter until the start of a current client frame is received;

(f) detecting the start of said current client frame;

(g) inserting in the preceding client frame a start of frame delimiter followed by the associated count of said incremented inter-frame counter, wherein said associated count of said incremented inter-frame time counter comprises a variable indication of time between when a start of said current client frame and an end of said preceding client frame were received;

(h) sending said preceding client frame to a receive buffer;

(i) inserting said end of frame delimiter when the end of said preceding frame is detected, wherein said end of frame delimiter signals a frame boundary of said current frame across said synchronous transport medium, and wherein said end of frame delimiter is utilized to reset said inter-frame counter;

(j) extracting said preceding client frame from said receive buffer to a mapper;

(k) synchronously mapping said preceding client frame into a synchronous protocol format associated with said synchronous transport medium, and serializing said mapped frame for transmission across said transport medium at a second data rate, wherein said synchronous transport medium is a SONET network, wherein said first client frame is encoded following extraction to maintain character synchronization, and wherein a rate of said first protocol format is one of greater and lesser than a rate of said synchronous transport medium; and (l) periodically reducing said incremented inter-frame counter to adjust a transmit rate.

* * * * *